United States Patent [19]

Sarkoezi

[11] Patent Number: 5,175,734
[45] Date of Patent: Dec. 29, 1992

[54] CLOCK SUPPLY FOR MULTIPLEX SYSTEMS

[75] Inventor: Imre Sarkoezi, Munich, Fed. Rep. of Germany

[73] Assignee: Siemens Aktiengesellschaft, Munich, Fed. Rep. of Germany

[21] Appl. No.: 873,697

[22] Filed: Apr. 22, 1992

Related U.S. Application Data

[63] Continuation of Ser. No. 587,035, Sep. 24, 1990, abandoned.

[30] Foreign Application Priority Data

Sep. 27, 1989 [DE] Fed. Rep. of Germany ....... 3932240

[51] Int. Cl.⁵ .............................. H04J 3/06; H04L 7/00
[52] U.S. Cl. ................................. 370/100.1; 370/101; 370/105.1; 375/106; 375/108
[58] Field of Search ........................ 370/105.3, 110.4; 375/116

[56] References Cited

U.S. PATENT DOCUMENTS

| | | |
|---|---|---|
| 3,548,104 | 12/1970 | Kuepfmueller . |
| 3,730,994 | 5/1973 | Terry et al. .................... 375/113 |
| 4,041,392 | 8/1977 | Gauriat et al. . |
| 4,078,153 | 3/1978 | Moreau ......................... 370/100.1 |
| 4,264,973 | 4/1981 | Husting .............................. 375/113 |
| 4,480,198 | 10/1984 | Gass ................................. 375/108 |
| 4,644,568 | 2/1987 | Canniff et al. ..................... 375/108 |
| 4,698,826 | 10/1987 | Denhez et al. ..................... 375/108 |

FOREIGN PATENT DOCUMENTS

| | | |
|---|---|---|
| 0263377 | 4/1988 | European Pat. Off. . |
| 1553778 | 1/1969 | France . |
| 2316674 | 1/1977 | France . |

Primary Examiner—Douglas W. Olms
Assistant Examiner—H. Kizou
Attorney, Agent, or Firm—Hill, Van Santen, Steadman & Simpson

[57] ABSTRACT

Clock supply for multiplex systems for distributing at least one system clock signal and at least one frame clock signal, whereby a marking circuit is provided to which both clock signals are provided and that generates a combined system-frame clock signal by marking the system clock signal. This combined system-frame clock signal is transmitted on a single clock line and being separated in turn into the system clock signal and the frame clock signal by a separating circuit.

14 Claims, 5 Drawing Sheets

CLOCK SUPPLY FOR MULTIPLEX SYSTEMS

This is a continuation of application Ser. No. 587,035, filed Sep. 24, 1990 now abandoned.

BACKGROUND OF THE INVENTION

The present invention is directed to a clock supply for multiplex systems clock supply for multiplex systems having at least one clock generator for distributing at least one system clock signal and at least one frame clock signal, whereby both the system clock signal as well as the frame clock signal are supplied to at least one assembly of the multiplexer system. The term "assembly" is used herein to refer to any type of electronic circuit or module used in multiplex systems.

In addition to supplying a system clock signal (bit clock signal) to individual assemblies, it is necessary in digital multiplex systems to also supply a frame clock signal to individual assemblies in order to achieve a proper allocation of the individual data channels transmitted. In digital cross-connect multiplexer systems, for example, the digital signals are patched in a time slot-controlled switching matrix network. To this end, a frame with time slots is formed in which the digital signals are classified. The through-connection in the switching matrix network occurs synchronously, i.e. the alignment of the time slots of the various digital signals must coincide. In order to assure this, a centrally generated frame clock for the system is required. All internal digital signal frames are generated using the frame clock. At the same time, a transit time equalization between the digital signals and the frame is implemented with phase matching circuits. Due to the spatial spread of the assemblies (function units), the problem occurs of bridging the existing distances without transit time dislocations between the system clocks and frame clocks, particularly in systems having high switching capacity. The transit times of the amplifiers and lines are no longer negligible for high bit rates. These difficulties are increased when a switching from a working clock supply to a standby clock supply with clock lines that are separately conducted for security reasons. In the prior art the system clock line and the frame clock line were conducted strictly in parallel with identical line lengths in order to obtain identical transit times.

For higher bit rates and/or long line lengths, this method, however, does not provide any assurance against undesired transit dislocation because of tolerance variations of the necessary intermediate repeaters and of the connecting cables.

SUMMARY OF THE INVENTION

It is an object of the present invention to provide a clock supply wherein substantially no transit time dislocation occurs between system clock signals and frame clock signals.

This object is achieved by a clock supply having: a marking circuit to which the system clock signal and the frame clock signal are supplied; a system-frame clock signal generated by a marking of the system clock signal controlled by the frame clock signal; this system-frame clock signal being transmitted on a single clock line; and at least one separating circuit that contains means for separating the system clock signal from the frame clock signal. The marking circuit can contain a means for blanking one or more pulses of the system clock signal on the basis of the frame clock signal a means for blanking one or more pulse gaps of the system clock signal on the basis of the frame clock signal, or a means for the addition of the system clock signal and of the frame clock signal or a marking pulse derived from the frame clock pulses thereof A plurality of frame clock signals can be combined with the system clock signal. A frame recognition circuit can be provided at the assemblies, the frame recognition circuit containing means for checking the plurality of modified pulses of the system clock signal. A summation circuit can be provided for at least one of the assemblies, the summation circuit combining a working system-frame clock signal and a standby system-frame clock signal by weighted addition or by logical operation and acquiring a resultant system clock signal and a resultant frame clock signal therefrom. A filter to which the system-frame clock signal is supplied can be provided at the assemblies and the system clock signal can be derived from the output signal of the filter.

The transmission of the system and frame clock signals has a combined system-frame clock signal which is transmitted on only one clock line that, dependent on the type of signal management, can be advantageously composed of one or two leads. No dislocation whatsoever between the two signals can consequently occur. For example, the system clock signal is varied (marked) at the beginning of the frame clock period and a recognition means for the frame clock signal is provided at the corresponding assemblies. The assemblies have their own frame clock counter that is merely synchronized by the frame clock signal. Since the frame clock signal is rarely mixed in, the spectrum is also only slightly modified. Any disturbing spectral components in the retrieval of the system clock signal at the assemblies thus also remains slight. The marking can occur on the basis of blanking, overlaying, polarization reversal, addition, etc. A particularly simple solution is the blanking of one or more pulses (for example of the logical 1) of the system clock signal.

An addition of the frame clock signal that occurs synchronously with the pulses of the system clock signal has the advantage that the system clock signal is always present.

The use of a filter in the retrieval of the system clock signal is advantageous. The filter is advantageously fashioned as a resonant circuit and also supplies a system clock signal when individual pulses or several pulses are blanked or altered.

When a working clock supply and a standby clock supply are provided, the resultant system-frame clock signals can be combined by weighted addition. This has the advantage that an undisturbed operation continues to be possible given outage or given repair of one clock supply. The phase shift between the two system-frame clock signals, however, must be less than 180° of a system clock signal and must be balanced as necessary.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
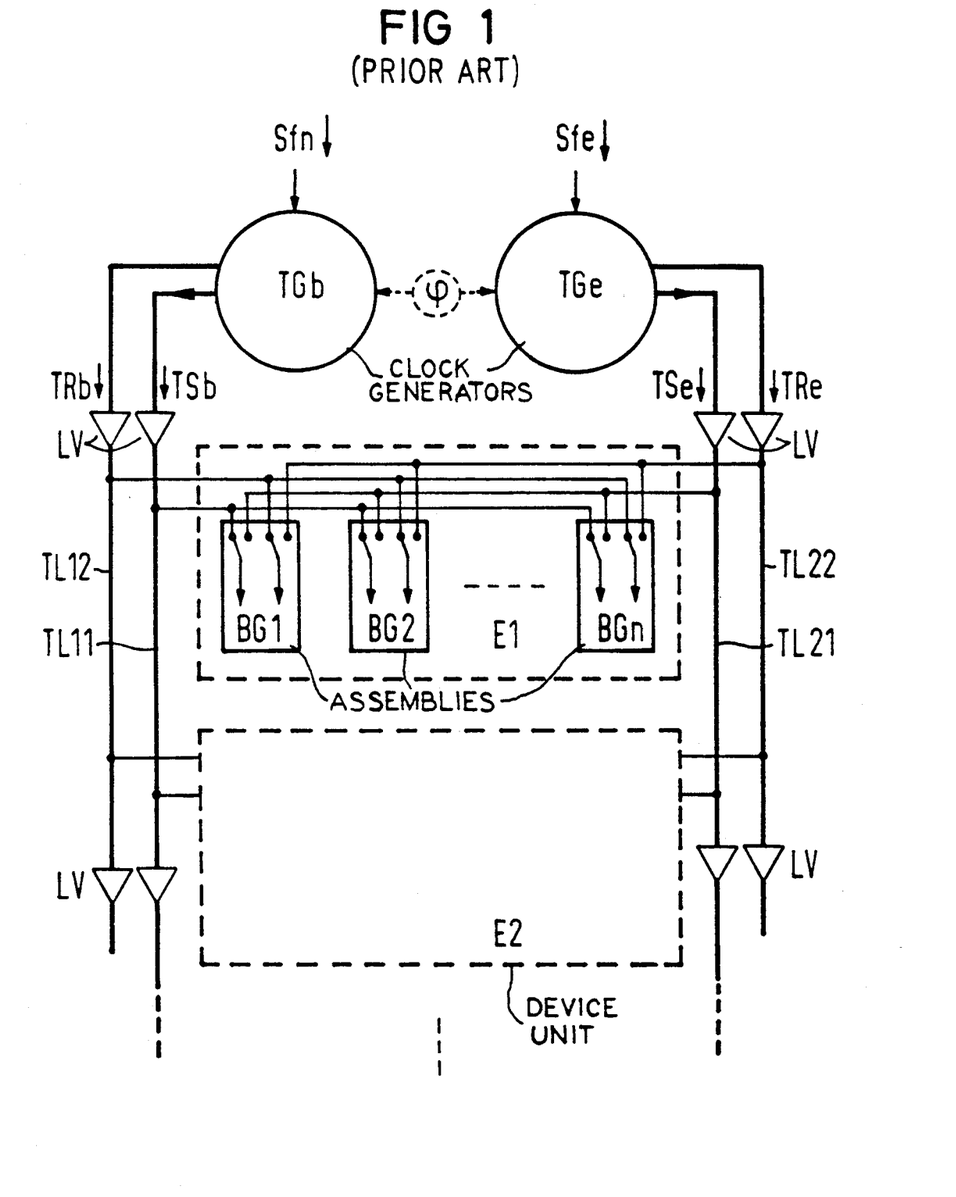
FIG. 1 is a diagram of a prior art clock supply.

FIG. 1 shows a standard prior art clock supply for a digital system. A working clock generator TGb to which a normal frequency signal Sfn may be supplied for synchronization supplies a working system clock signal TSb and a working frame clock signal TRb. The two clock signals are supplied in parallel to assemblies BG1 through BGn of device units (inserts) E1, E2 via clock lines TL11 and TL12. Corresponding standby clock signals TSe and TRe are supplied to the assemblies BG1 through BGn from a standby clock generator TGe via further clock lines TL21 and TL22. Transit time problems result due to tolerances of line amplifiers LV and of the clock lines. Given systems having standby clock supplies, as shown in FIG. 1, the same transit time problems result in the management of the standby clock signals.

Figure 2:
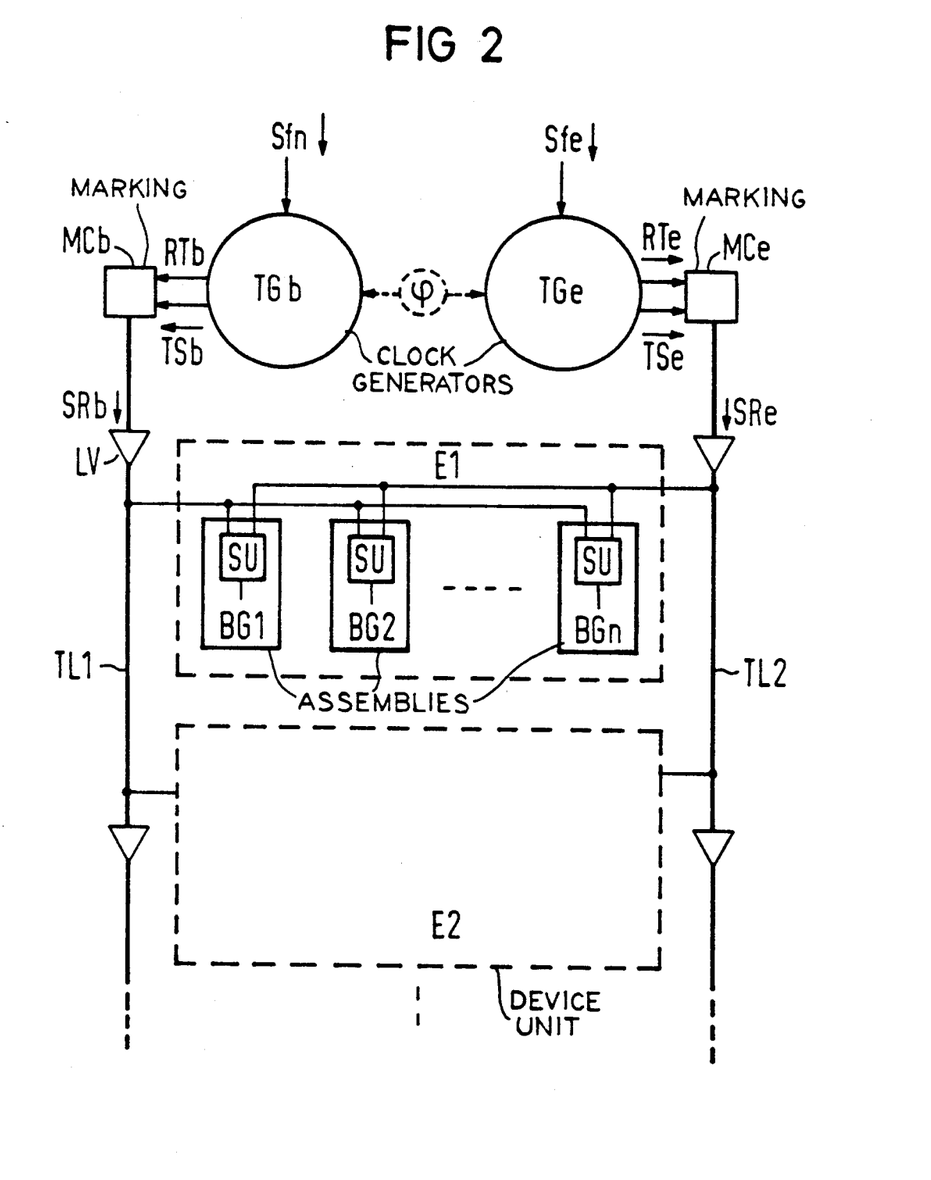
FIG. 2. is a diagram of a clock supply of the present invention.

FIG. 2 shows a clock supply of the present invention. Therein, the working system clock signal TSb and the working frame clock signal RTb are combined in a marking circuit MCb. This occurs by marking, i.e. modifying the system clock signal at the appearance of the frame clock signal usually at the beginning of a pulse frame. Transit times and transit fluctuations now have a uniform effect given the working system-frame clock signal SRb acquired in this manner and transmitted via a single clock line L1. The assemblies BG1 through BGn are therefore always supplied with a system clock signal having a phase-rigidly allocated marking for the beginning of a pulse frame.

The present invention is suitable both for clock supplies having only one clock generator as well as for clock supplies having an additional standby clock generator TGe as shown in FIG. 2. The clock signals of the standby clock generator are identified with the letter "e".

Figure 3:
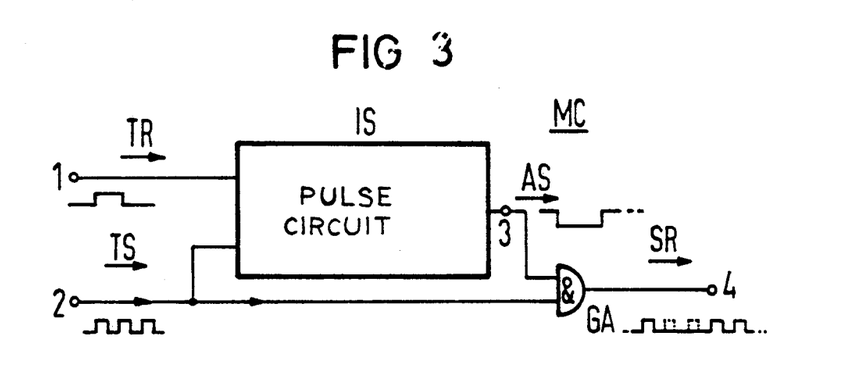
FIG. 3 is a diagram of a combining circuit.

A marking of the system clock signal TS can occur by blanking one or more clock pulses. A corresponding marking circuit MC is shown in FIG. 3. The frame clock signal TR is supplied to a first input 1 of a pulse circuit IS. The system clock signal TS is supplied to a second input 2 thereof. The output 3 is connected to a first input of a gate GA to whose second input the system clock signal TS is supplied. The system-frame clock signal SR is output at the output 4 of the gate.

The pulse circuit has the function of converting the frame clock pulse RI into a blanking pulse AS that is phase locked relative to the pulses of the system clock signal. This prevents the pulses of the synchronous clock signal from being shortened by the blanking pulse and prevents the creation of noise pulses.

Figure 4:
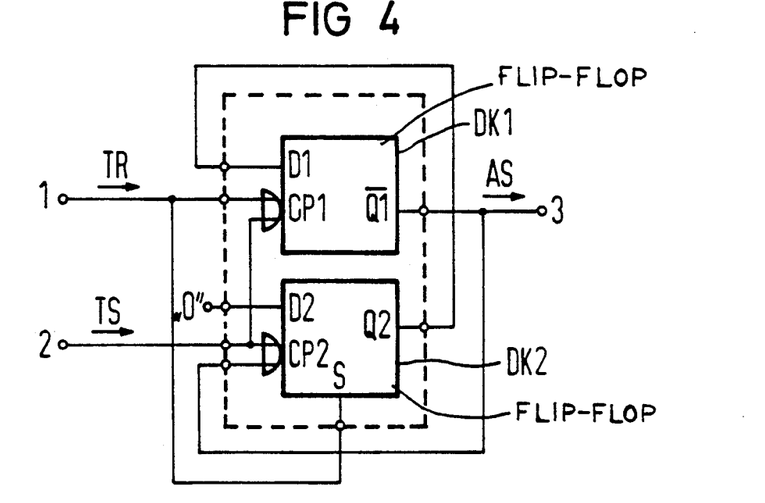
FIG. 4 is a diagram of a circuit for generating a blanking signal.

FIG. 4 shows a pulse circuit constructed with two D-flipflops DK1 and DK2. The data input D1 of the first D-flipflop DK1 is connected to the output Q2 of the second D-flipflop DK2. Every flipflop has a clock input CP1, CP2 which is respectively preceded by an OR gate. The frame clock signal TS is supplied to the clock input CP1 of the first flipflop DK1 via this OR gate, this frame clock signal TS being simultaneously conducted to the setting input S of the second D-flipflop DK2. The inverting output $\overline{Q1}$ of the first D-flipflop DK1 forms the output of the pulse circuit. This is connected to the clock input of the OR gate that precedes the second D-flipflop. The system clock signal TS is respectively supplied to the second input of the preceding OR gates of both flipflops. The data input D2 is at logical 0.

Figure 5:
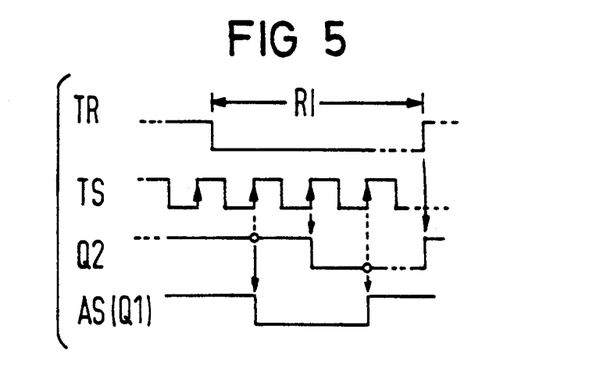
FIG. 5 is a time diagram.

The clock input CP1 of the first D-flipflop is enabled given the appearance of a frame clock pulse RI (logical 0) of the frame clock signal TR. The first D-flipflop DK1 outputs a negative pulse at its output 3 with the next, positive signal edge of the system clock signal TS. As a result thereof, the second D-flipflop DK2 can also be clocked with the next, positive signal edge that subsequently enables a resetting of the first D-flipflop DK1 and thus ends the blanking pulse AS (FIG. 5). A blanking of pulse gaps can occur in a corresponding manner, i.e. the clock signal then remains at logical 1.

Figure 6:
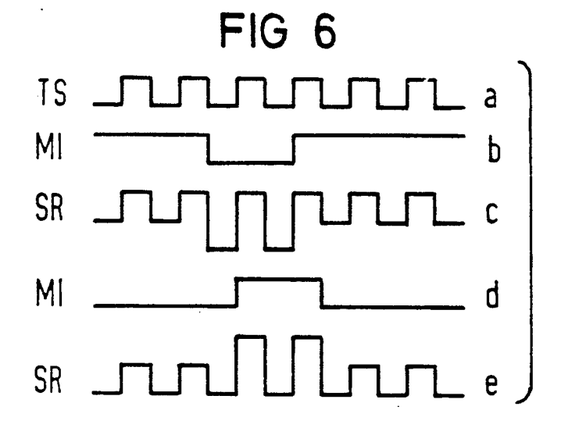
FIG. 6 is a time diagram having further marking possibilities of the system clock signal.

FIG. 6 shows two further possibilities for marking by addition. According to trace b, the marking pulse MI is generated that covers two successive, logical zeros of the system clock signal TS. A negative potential in accordance with trace c is output during the duration of the frame pulse instead of the logical 0. According to trace d, the marking pulse can also cover two positive pulses of the synchronous clock signal TS. For example, two pulses having twice the amplitude are output during the duration thereof. Both system-frame clock signals shown in traces c and e of FIG. 6 have the advantage that the spectrum of the system clock signal is merely overlaid but is always present. Different voltages merely have to be applied to the corresponding components over the duration of the frame pulses. Such a circuit arrangement can be easily realized in a great variety of ways. Of course, superframe and subframe clock signals can also be combined with the system clock signal.

Figure 7:
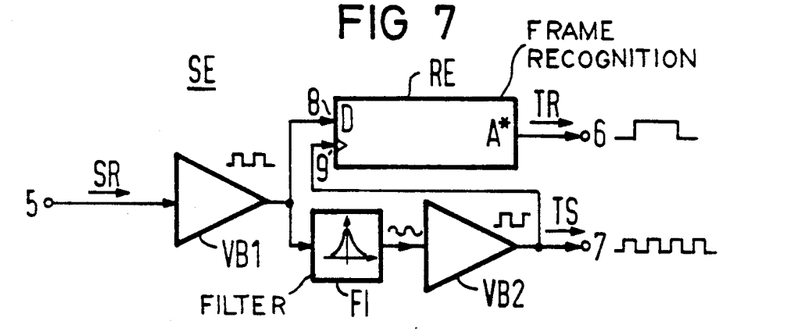
FIG. 7 is a diagram of a separating circuit.

FIG. 7 shows a separating circuit SE that reconverts the system-frame clock signal SR into the system clock signal TS and into the frame clock signal TR. The system-frame clock signal SR is supplied to the input 5 of a limiting amplifier VB1. The output of the limiting amplifier is connected via a drive circuit (not shown here) to a filter FI that is expediently structured as a resonant circuit that is tuned to the frequency of the system clock signal TS. The filter output is connected to the input of a second limiting amplifier VB2 at whose output 7 the system clock signal TS is output. This output is connected to the clock input 9 of a frame recognition means RE whose data input 8 is connected to the output of the first limiting amplifier VB1 and at whose output 6 the frame clock signal TR is output.

The system-frame clock signal SR is first converted into square-wave pulses by the limiting amplifier VB1. These square-wave pulses drive the filter FI that merely selects the frequency of the system clock TS. The second limiting amplifier VB2 provides the conversion into a square-wave system clock signal TS. This is phase-shifted in comparison to the limited system-frame clock signal output by the first limiting amplifier VB1. Given a marking on the basis of missing pulses, these are converted into the frame clock signal TR by the frame recognition means RE. Although this is phase-shifted in comparison to the original frame clock signal, this is not relevant since it only serves the purpose of synchronization. The resonant circuit provides that no gaps arise in the system clock signal TS. The filter is always necessary when pulses are blanked or superimposed. Even for other types of marking, however, disturbances of the system clock signal are avoided by the filter.

Figure 8:
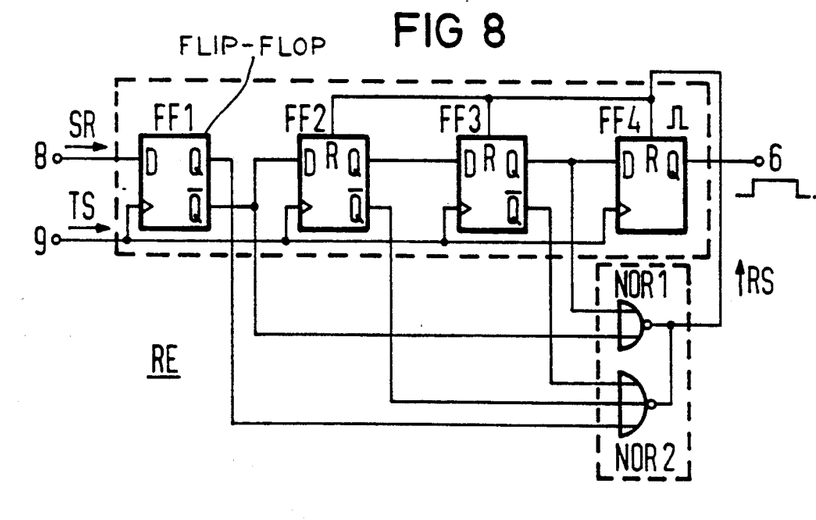
FIG. 8 is a diagram of a monitoring circuit.

FIG. 8 shows a frame recognition circuit RE (and checking circuit). It is composed of four D-flipflop FF1 through FF4 that are connected as a shift register, whereby, however, the $\bar{Q}$-output of the first D-flipflop FF1 is connected to the D-input of the second D-flipflop FF2. The system-frame clock signal SR is supplied to the D-input 8 of the first flipflop FF1; all clock inputs 9 are interconnected. The system clock signal TS is applied to them. A first NOR gate NOR 1 is connected to the inverting output $\bar{Q}$ of the first D-flipflop FF1 and to the Q-output of the third D-flipflop FF3 and resets the last three flipflops FF2 through FF4 with a reset pulse RS when only a single pulse is blanked. A second NOR gate NOR 2 is connected to the outputs of the first three flipflops FF1 through FF3 such that the last three flipflops are reset when more than two pulses are blanked. The outputs of both NOR gates are connected via a connected OR circuit. Corresponding frame recognition means and check circuits, of course, can also be simply realized for only one blanked pulse and for other types of marking.

Figure 9:
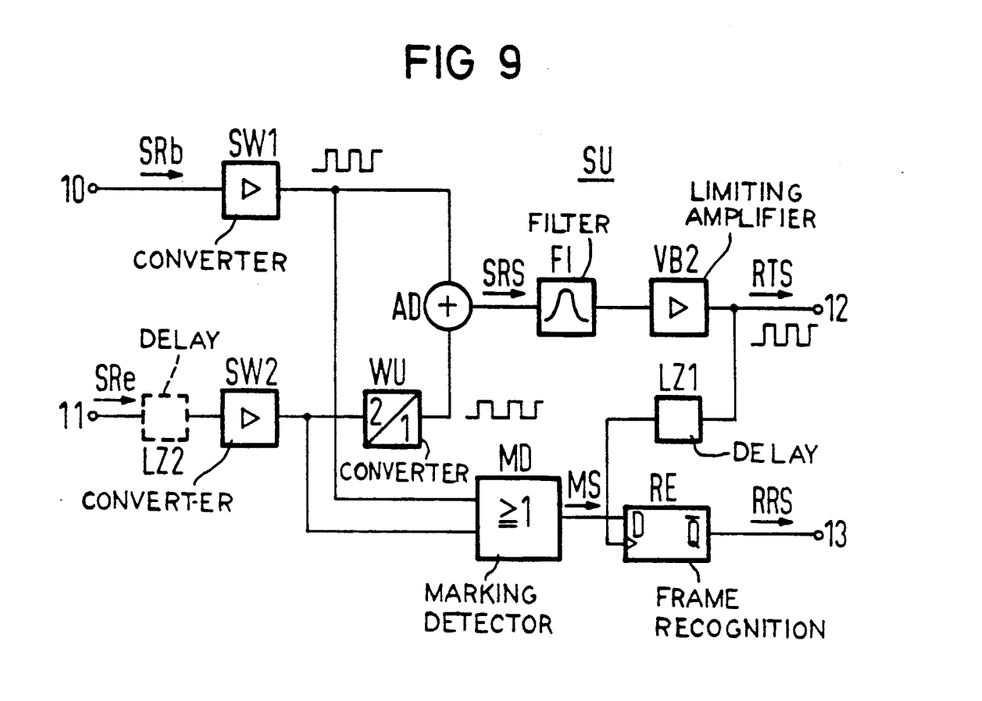
FIG. 9 is a diagram of a summation circuit given employment of a working clock supply and of a standby clock supply.

FIG. 9 shows the fundamental circuit diagram of a summation circuit SU that replaces the standard switchover means in FIG. 2. The summation circuit contains a first spectral converter SW1 whose output is connected to a first input of an adder AD. The working system-frame clock signal SRb is supplied to the input 10 of this spectral converter. The standby system-frame clock signal SRe is supplied from an input to a second spectral converter SW2, potentially via a delay element LZ2, the output of this second spectral converter SW2 being connected via a voltage converter WU to the second input of the adder AD. The output of the adder is connected to the filter FI, for example, a resonant circuit, whose output is connected to the second limiting amplifier VB2 in the way known from FIG. 7, a resultant system clock signal RTS being output at the output 12 of this second limiting amplifier VB2.

The outputs of the spectral converters SW1 and SW2 are connected to a marking detector MD that follows the frame recognition means RE. The clock input of the frame recognition means is connected to the output 2 of the second limiting amplifier, potentially via a first delay element LZ1.

Figure 10:
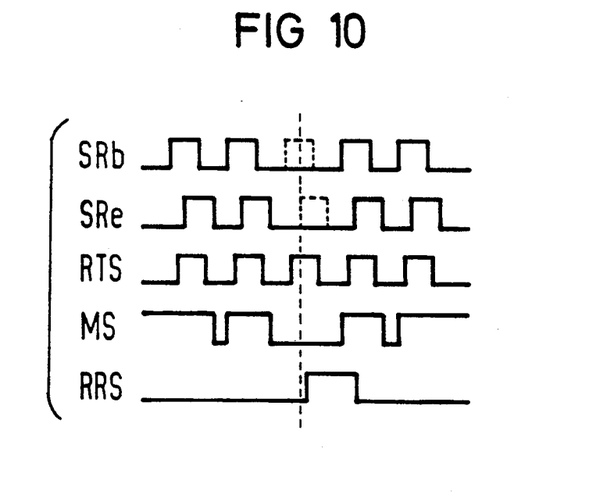
FIG. 10 is a time diagram.

A weighted addition of the system-frame clock signals is carried out by the summation circuit. An aggregate signal thereby remains present even given a phase difference of 180° of the system-frame clock signal. Due to the marked frame beginnings, however, the phase difference must generally be less than 180° so that no disturbances occur given the outage of a clock signal. In the example, the summation occurs arithmetically. However, a logical operation (OR, AND, EX-OR) of the system-frame clock signals is also possible. A resultant system clock signal RTS is taken from the resultant system-frame clock signal SRS. The marking detector MD, an OR gate in the case of marking with a blanked pulse, supplies a marking signal MS according to the time diagram of FIG. 10 that is supplied to the D-flipflop serving as frame recognition means RE and is sampled with the resultant system clock signal RTS. A resultant frame clock signal RRS is output at the output 13 of the frame recognition means. Given outage of a system-frame clock signal SRb or SRe, clock signals that are merely modified in phase result at the outputs of the summation circuit. Greater phase deviations between the system-frame clock signals SRb and SRe, for example due to different lengths of the clock lines L1 and L2, can be avoided by suitable wiring or by a second delay element LZ2 that precedes one of the spectral converters.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A clock supply arrangement for a time division multiplex system having at least one clock generator for generating at least one system clock signal and at least one frame clock signal, both the system clock signal and the frame clock signal being supplied to at least one assembly in the multiplex system, comprising: a marking circuit to which the system clock signal and the frame clock signal are supplied, the marking circuit outputting on an output thereof, a system-frame clock signal generated by modifying the system clock signal with the frame clock signal, the marking circuit having one of means for blanking at least one pulse of the system clock signal and means for extending a pulse of the system clock signal over at least one gap between pulses of the system clock signal; and at least one separating circuit for separating the system clock signal and the frame clock signal from the system-frame clock signal, said at least one separating circuit having an input for receiving the system-frame clock signal, said at least one separating circuit supplying the system clock signal and the frame clock signal to the at least one assembly, said at least one separating circuit having means for separating the system clock signal from the system-frame clock signal and frame recognition circuit for separating the frame clock signal from the system-frame clock signal; and a single clock line connected between said output of said marking circuit and said input of said at least one means for separating, said at least one separating circuit having a filter to which the system-frame clock signal is supplied, said filter having a resonant frequency that corresponds to the frequency of the system clock signal and having an output on which the system clock signal is provided, said frame recognition circuit having at least one flip-flop that is triggered by the system clock signal.

2. The clock supply arrangement according to claim 1, wherein a plurality of frame clock signals are combined with the system clock signal.

3. The clock supply arrangement according to claim 1, wherein said frame recognition circuit has means for checking a plurality of modified pulses of the system clock signal.

4. A clock supply arrangement for a time division multiplex system having a working clock generator and a stand-by clock generator, each for generating a system clock signal and at least one frame clock signal, both the system clock signal and the frame clock signal of the working clock generator and the stand-by clock generator being supplied to at least one assembly in the multiplexer system, comprising: a stand-by marking circuit and a working marking circuit for the stand-by and working clock generators, respectively, each of which receives the system clock signal and the frame clock signal, the stand-by and working marking circuits outputting on respective outputs thereof a stand-by system-frame clock signal and a working system-frame clock signal, each generated by modifying the system clock signal with the frame clock signal to form the respective system-frame clock signal; each of the working system-frame clock signal and the stand-by system frame clock signal being transmitted on a single clock line connecting a respective marking circuit to the at least one assembly; a summation circuit having first and second inputs for receiving the working and stand-by system-frame clock signals, the summation circuit combining the received working and stand-by system-free clock signals by weighted addition to form a resultant system-frame clock signal which is the sum of the working and the stand-by system frame clock signals; at least one separating circuit connected to the summation circuit for separating the system clock signal and the frame clock signal from the resultant system-frame clock signal, said at least one separating circuit having means for separating the system clock signal from the resultant system-frame clock signal and frame recognition circuit for separating the frame clock signal from the working and stand-by system-frame clock signals.

5. The clock supply arrangement according to claim 4, wherein each of the working and stand-by marking circuits contains means for blanking one or more pulses of the system clock signal on the basis of the frame clock signal.

6. The clock supply arrangement according to claim 4, wherein each of the working and stand-by marking circuits contains means for blanking one or more pulse gaps between pulses of the system clock signal on the basis of the frame clock signal.

7. A clock supply arrangement for a time division multiplex system having at least one clock generator for generating at least one system clock signal and at least one frame clock signal, both the system clock signal and the frame clock signal being supplied to at least one assembly in the multiplex system, comprising: a marking circuit to which the system clock signal and the frame clock signal are supplied, the marking circuit outputting on an output thereof, a system-frame clock signal generated by modifying the system clock signal with the frame clock signal, the marking circuit having one of means for blanking at least one pulse of the system clock signal and means for extending a pulse of the system clock signal over at least one gap between pulses of the system clock signal; and at least one separating circuit for separating the system clock signal and the frame clock signal from the system-frame clock signal, said at least one separating circuit having an input for receiving the system-frame clock signal, said at least one separating circuit supplying the system clock signal and the frame clock signal to the at least one assembly, said at least one separating circuit having means for separating the system clock signal from the system-frame clock signal and frame recognition circuit for separating the frame clock signal from the system-frame clock signal; and a single clock line connected between said output of said marking circuit and said input of said at least one means for separating;

the frame recognition circuit having a plurality of flip-flops connected to form a shift register, the plurality of flip-flops being triggered by the system clock signal separated from the system-frame clock signal by the separating circuit.

8. A clock supply arrangement for a time division multiplex system having a working clock generator and a stand-by clock generator, each for generating at least one system clock signal and at least one frame clock signal, both the system clock signal and the frame clock signal of one of the working clock generator and the stand-by clock generator being supplied to at least one assembly in the multiplexer system, comprising: a stand-by marking circuit and a working marking circuit for the stand-by and working clock generators, respectively, each of which receives the system clock signal and the frame clock signal, the stand-by and working marking circuits outputting on respective outputs thereof a stand-by system-frame clock signal and a working system-frame clock signal, each generated by modifying the system clock signal with the frame clock signal to form the respective system-frame clock signal; at least one summation circuit having first and second inputs for receiving the working and stand-by system-frame clock signals, the at least one summation circuit combining the received working and stand-by system-free clock signals by one of weighted addition and logical combination of the working and stand-by system-frame clock signals to form a resultant system-frame clock signal; at least one separating circuit connected to the at least one summation circuit for separating the system clock signal and the frame clock signal from the resultant system-frame clock signal, said at least one separating circuit supplying the system clock signal and the frame clock signal to the at least one assembly, said at least one separating circuit having means for separating the system clock signal from the system-frame clock signal and frame recognition circuit for separating the frame clock signal from the system-frame clock signal; and first and second signal clock lines connected between said outputs of said working and stand-by marking circuits, respectively, and said first and second inputs, respectively, of said at least one summation circuit;

the frame recognition circuit having a plurality of flip-flops connected to form a shift register, the plurality of flip-flops being triggered by the system clock signal separated from the system-frame clock signal by the separating circuit.

9. A clock supply arrangement for a time division multiplex system having a working clock generator and a stand-by clock generator, each for generating at least one system clock signal and at least one frame clock signal, both the system clock signal and the frame clock signal of one of the working clock generator and the stand-by clock generator being supplied to at least one assembly in the multiplexer system, comprising: a stand-by marking circuit and a working marking circuit for the stand-by and working clock generators, respectively, each of which receives the system clock signal and the frame clock signal, the stand-by and working marking circuits outputting on respective outputs thereof a stand-by system-frame clock signal and a working system-frame clock signal, each generated by modifying the system clock signal with the frame clock signal to form the respective system-frame clock signal; at least one summation circuit having first and second inputs for receiving the working and stand-by system-frame clock signals, the at least one summation circuit combining the received working and stand-by system-free clock signals by one of weighted addition and logical combination of the working and stand-by system-frame clock signals to form a resultant system-frame clock signal; at least one separating circuit connected to the at least one summation circuit for separating the system clock signal and the frame clock signal from the resultant system-frame clock signal, said at least one separating circuit supplying the system clock signal and the frame clock signal to the at least one assembly, said at least one separating circuit having means for separating the system clock signal from the system-frame clock signal and frame recognition circuit for separating the frame clock signal from the system-frame clock signal; and first and second signal clock lines connected between said outputs of said working and stand-by marking circuits, respectively, and said first and second inputs, respectively, of said at least one summation circuit;

the received working system-frame clock signals and received stand-by system-frame clock signals being combined by logical combination in the at least one summation circuit, and the resultant system-frame clock signal being triggered by the system clock signal supplied by the at least one separating circuit.

10. The clock supply arrangement according to claim 1, wherein the frame recognition circuit has a plurality of flip-flops connected to form a shift register, the plurality of flip-flops being triggered by the system clock signal that is separated from the system-frame clock signal by the separating circuit.

11. The clock supply arrangement according to claim 4, wherein a plurality of frame clock signals are combined with the system clock signal.

12. The clock supply arrangement according to claim 1, wherein the frame recognition circuit has at least one flip-flop being triggered by the system clock signal separated from the system-frame clock signal by the separating circuit.

13. The clock supply arrangement according to claim 4, wherein the frame recognition circuit has a plurality of flip-flops connected to form a shift register, the plurality of flip-flops being triggered by the system clock signal that is separated from the system-frame clock signal by the separating circuit.

14. The clock supply arrangement according to claim 4, wherein the received working system-frame clock signals and received stand-by clock signals are combined by logical combination and wherein the combined signal is triggered by the system clock signal supplied by the separating circuit.

* * * * *